United States Patent
Pientka

(10) Patent No.: US 6,433,501 B2
(45) Date of Patent: *Aug. 13, 2002

(54) SENSOR DEVICE FOR DETECTING MOISTURE ON A WINDOW

(75) Inventor: Rainer Pientka, Renchen (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/445,528

(22) PCT Filed: Jan. 12, 1999

(86) PCT No.: PCT/DE99/00032

§ 371 (c)(1),
(2), (4) Date: Apr. 13, 2000

(87) PCT Pub. No.: WO99/52752

PCT Pub. Date: Oct. 21, 1999

(30) Foreign Application Priority Data

Apr. 8, 1998 (DE) .......................................... 198 15 746

(51) Int. Cl.$^7$ ................................................ G05B 5/00
(52) U.S. Cl. .................................. 318/483; 318/DIG. 2
(58) Field of Search ............................ 318/483, DIG. 2; 340/602, 604; 250/574, 573; 15/DIG. 15

(56) References Cited

U.S. PATENT DOCUMENTS

| | | | |
|---|---|---|---|
| 4,355,271 A | | 10/1982 | Noack |
| 5,059,877 A | | 10/1991 | Teder |
| 5,386,111 A | * | 1/1995 | Zimmerman ................ 318/483 |
| 5,898,183 A | | 4/1999 | Teder |
| 6,118,383 A | * | 9/2000 | Hegyi ........................ 318/483 |

FOREIGN PATENT DOCUMENTS

| | | |
|---|---|---|
| DE | 44 03 221 | 1/1995 |
| DE | 195 26 249 | 2/1996 |
| DE | 197 01 258 | 7/1997 |
| EP | 0 444 520 | 9/1991 |

* cited by examiner

Primary Examiner—Khanh Dang
(74) Attorney, Agent, or Firm—Kenyon & Kenyon

(57) ABSTRACT

A sensor device is described for detecting wetting, in particular rainfall and soiling, on a windshield that has at least one transmitter and at least one receiver for the light emitted by the transmitters where transmitters and receivers are arranged at the corner points of an imaginary triangle or parallelogram. As a result, the outside dimensions of the sensor are reduced, and the ratio of sensitive area to base area of the sensor is improved.

11 Claims, 2 Drawing Sheets

SENSOR DEVICE FOR DETECTING MOISTURE ON A WINDOW

FIELD OF THE INVENTION

The present invention relates to a sensor device for detecting wetting of a windshield.

BACKGROUND INFORMATION

German Patent No. 197 01 258 describes a sensor device that operates according to an optoelectronic principle for controlling wash/wipe systems for automotive windshields. The sensor device has multiple transmitters and at least one receiver for injecting and outputting via a coupling means a defined radiation into and out of the windshield whose wetting due to moisture or soiling is to be measured. The radiation is completely reflected at least once in the windshield on the (dry) surface of the windshield due to the injection angle and finally is output again to a receiver at a predetermined location. Total reflection is prevented by wetting of the surface of the windshield (air, water, ice, dirt, fog, etc.), resulting in wetting-dependent radiation losses due to output of a portion of the radiation from the original beam path, e.g., due to water droplets.

The diminished radiation detected by the receiver is outputted as a sensor signal to a signal processing arrangement, where it is analyzed with regard to controlling a wash or wipe system for an automotive windshield, for example. A controller controls the wiper motor in continuous or interval wiping mode as a function of the sensor signal analyzed.

According to German Patent No. 197 01 258, the transmitters are arranged concentrically around the receiver on the coupling means or concentrically in sections, the coupling means having a circular or toroidal design. Thus, a circular base area is spanned by transmitters, receivers and coupling means. For this reason, the sensor, i.e., the sensor casing, is in the form of a round cylinder.

The sensitive area of the sensor is defined by the sum of the measuring ranges of the windshield located approximately between a transmitter and the respective receiver, i.e., the one receiving the radiation. The measuring range is understood to be the range on the wettable side of the windshield within which the transmitter radiation is completely reflected in the absence of wetting, and therefore the transmitter radiation can be outputted more or less in the measuring range because of wetting of the windshield.

One disadvantage here is the circular base area defined by the transmitters, receivers and coupling means and the round cylindrical sensor casing, leading to a relatively great extent of the sensor and its contact area on the windshield and therefore making the sensor noticeable and causing interference for the driver of the vehicle when it is mounted within the wiping area on the windshield, as is customary today.

Another disadvantage here is the small proportion of sensitive area relative to the base area of the sensor, i.e., its contact area. This is due to the fact that with a predetermined number of transmitters, e.g., eight, the non-sensitive areas between the transmitters arranged on the outer perimeter of the base area are large, usually much larger than the sensitive areas.

To increase the size of the sensitive area, a great number of transmitters could be used. However, then the sensor would be more expensive without eliminating the disadvantages of the extent, i.e., contact area, of the sensor.

SUMMARY OF THE INVENTION

The sensor device according to the present invention has the advantage that the images of the transmitter and receiver as optical elements projected onto a plane parallel to the windshield form the corner points of a parallelogram or an isosceles triangle. The ratio of sensitive area to base area is increased by this arrangement of optical elements.

Due to the reduced base area, the outside dimensions of the sensor on the windshield and thus its contact area are likewise reduced. It is especially advantageous that due to the trapezoidal base area, rectangular outside dimensions of the sensor casing are selected, so that the base area can be arranged in the contact area with optimal utilization of the latter. In addition, a rectangular contact area, i.e., casing, is less expensive to manufacture.

The arrangement of the transmitters and receivers as a parallelogram is especially advantageous, such that two transmitters or two receivers are arranged at the opposite corner points. Thus four measuring zones, i.e., sensitive areas, of the sensor are implemented with only two sensors and two receivers by using transmitters whose transmitter light is bundled and deflected in two directions. The accuracy of the sensor in detecting wetting of the windshield is thereby greatly improved. This doubles the sensitive area in comparison with conventional transmitters emitting radiation to only one receiver.

It is also advantageous that the distances between the transmitters and receivers and thus the sides of the parallelogram are the same length. This converts the parallelogram to a rhombus. In particular, the distances are defined by the choice of only total reflection of the transmitter radiation in the windshield before the radiation is detected by a receiver. Consequently, the distances are minimal and thus the sides of the base area are also minimal.

It is likewise advantageous that the angles between the sides of the base area can be varied, and thus the base area can be adapted to the outside dimensions of the sensor and vice versa. For example, if only a narrow rain sensor can be used because of the automobile manufacturer's requirements or the specifics of a given vehicle, smaller acute angles can be selected accordingly without any great effort until the extent of the base area can be optimally integrated into the outside dimensions of the sensor casing.

Consequently, it is especially advantageous for the transmitters and receivers to be arranged within the contact area of the sensor device, with the base area being optimally integrated into the contact area while at the same time the ratio of the sensitive area to the base area is increased. This yields an inexpensive sensor with small outside dimensions.

DETAILED DESCRIPTION

Figure 1:
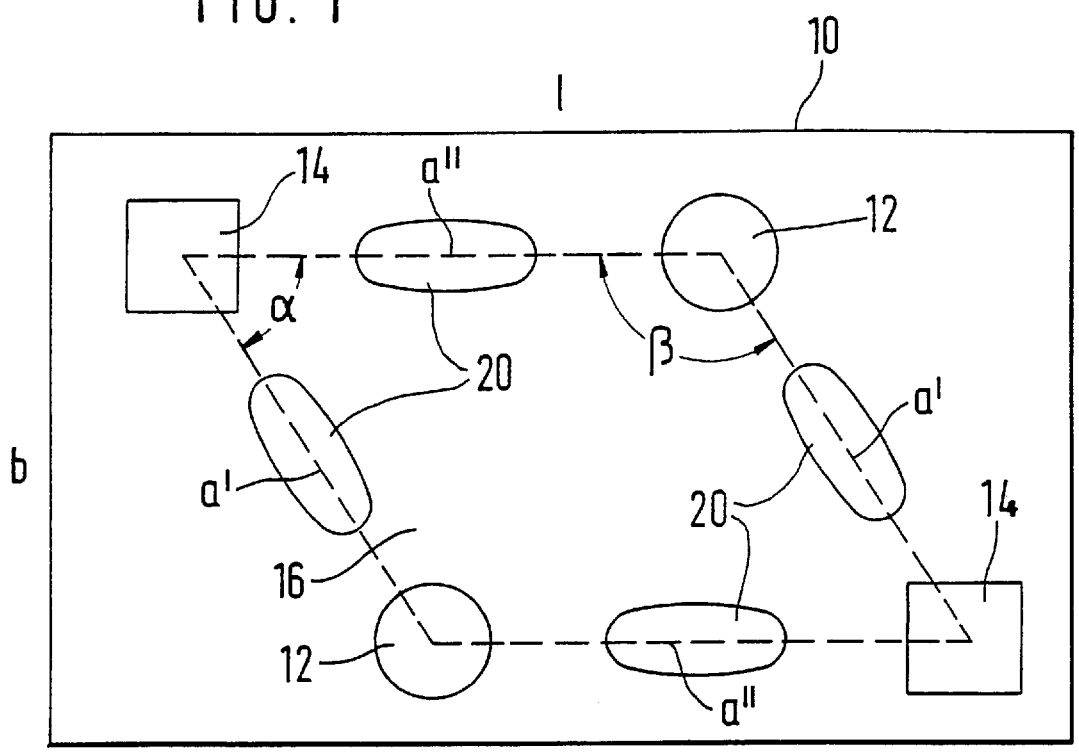
FIG. 1 shows a first embodiment of a sensor device according to the present invention.
Figure 2:
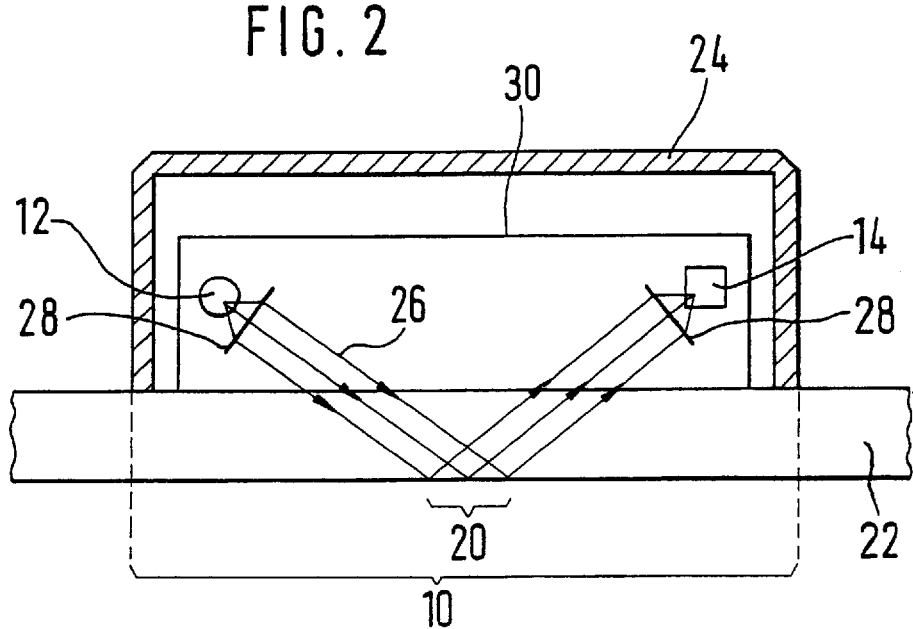
FIG. 2 shows a through section of a sensor device according to the present invention.

FIGS. 1 and 2 show a rectangular contact area 10 with width b and length 1 of a sensor device having a sensor casing 24 on a windshield 22. Its contact area 10 is defined by contact of the sensor with windshield 22, for example. In general, the outside dimensions of contact area 10 correspond to the outside dimensions of the sensor device. However, contact area 10, for example, is also a projection of the outside dimensions of sensor casing 24 with a front view of windshield 22. Therefore, as an alternative, sensor casing 24 may bulge over the contacted area of windshield 22, accommodating optical elements of the sensor within it.

The sensor device is mounted, for example, in the wiping area of a windshield wiper on the inside of an automotive windshield 22 or integrated into the base of a vehicle rearview mirror. Not shown here is the mounting of sensor casing 24 or a fiber optic body on windshield 22.

The fiber optic body or casing 24 is preferably mounted on windshield 22 by gluing, the former having the function of injecting light 26 emitted by a transmitter 12 into windshield 22 and outputting light 26 directed in windshield 22 by partial or total reflection to a receiver 14 at another predetermined location. This takes place at lenses 28, refractive surfaces or mirrors integrally molded on the fiber optic body to bundle, deflect or divert beams 26 in the desired direction.

Above contact area 10, i.e., the fiber optic body, two light emitting transmitters 12 and two light detecting receivers 14 are mounted on an essentially conventional mounting device within sensor casing 24. A circuit board 30 carrying the electronic components or a sensor control is often available as a mounting device for attachment of transmitters 12 and receivers 14. Transmitters 12 are preferably light emitting diodes (LEDs), receivers 14 are light receiving diodes (LRDs), with transmitter radiation 26 preferably being in the infrared (IR) range or in the visible (VIS) range.

Transmitters 12 and receivers 14 span a base area 16 (indicated with dotted lines) corresponding according to the present invention to a parallelogram or a double triangle having sides a' and a". Preferably two sides a', a" of base area 16 are of equal or approximately equal length because of the tolerances in the dimensions and in assembly of transmitters 12 and receivers 14.

Distances a' and a" between transmitters 12 and receivers 14, i.e., the sides of base area 16, are defined, inter alia, by the wavelength of the emitted radiation of transmitter 12, the thickness of windshield 22 and of the fiber optic body, the refractive index of windshield 22 as well as the angle of incidence and the point of incidence of radiation 26 into windshield 22 so that radiation 26 injected into windshield 22 is completely reflected only once at the surface of windshield 22, preferably on the outside of the automotive windshield, and then guided out of windshield 22 to receiver 14.

With more than a desired total reflection on the wettable outside of windshield 22, distances a' and a" of transmitters 12 and receivers 14, respectively, would be selected to be larger accordingly. Furthermore, distances a' and a" from a transmitter 12 and receiver 14 that do not belong together, i.e., transmitter 12 does not emit radiation to this receiver 14, may be selected as desired.

Sensitive areas 20 illustrated here correspond to the areas on the wettable side of windshield 22 where there is total reflection of radiation 26 when windshield 22 is not wetted. The extent of sensitive areas 20 will vary depending on the arrangement of transmitters 12 and receivers 14 relative to windshield 22, the thickness of windshield 22 and the diameter of transmitter beam 26.

According to FIG. 1, distance a" for example corresponds to total reflection in windshield 22 of light 26 emitted by transmitter 12 to receiver 14. Distance a' and thus the distance between independent transmitters 12 and receivers 14 can be selected as desired. Therefore, the dimensions of the parallelogram and thus of base area 16 and of contact area 10 are determined essentially by the choice of distance a' and angle $\alpha$.

Angles $\alpha$ and $\beta$ between two sides of the parallelogram can be selected freely, angle $\alpha$ here by definition referring to each smaller angle or acute angle of the parallelogram. Angle $\alpha$ is assigned an angle range from almost zero to ninety degrees.

Criteria for the selection of an angle include, for example, the outside dimensions of the sensor, in particular the ratio of length 1 to width b of its contact area 10, as well as the dimensions of sensitive areas 20 between transmitters 12 and receivers 14, so that there is no unwanted overlapping of sensitive areas 20 and thus a restriction of the sensitivity of the sensor. In addition, the beam diameter and the dimensions of sensors 12 and receivers 14 must also be taken into account. Furthermore, distance a" between transmitter 12 and receiver 14 and thus the number of total reflections achieved in windshield 22 must also be considered.

For example, angle $\alpha$ will usually be selected to be small when contact area 10 of the sensor is long and narrow, i.e., rectangular, e.g., $\alpha=45°$. On the other hand, angles $\alpha$, $\beta$ may form right angles, yielding a square or rectangular design of the sensor. An angle range of 65° to 70° is preferred.

In an improved version of this embodiment, four measuring zones are implemented with two transmitters 12 and two receivers 14 by bundling radiation 26 emitted by transmitters 12 in two directions using lenses 28 or the like, and deflecting it to two receivers 14. Consequently, all distances a', a" are to be selected so as to yield a given number of total reflections in windshield 22. Distances a', a" are preferably equal. Base area 16 is thus a rhombus, i.e., a double triangle, composed of two isosceles triangles. The four measuring zones thus double sensitive areas 20 of the sensor and therefore improve its sensitivity in detection of rainfall with the same design.

Figure 3A:
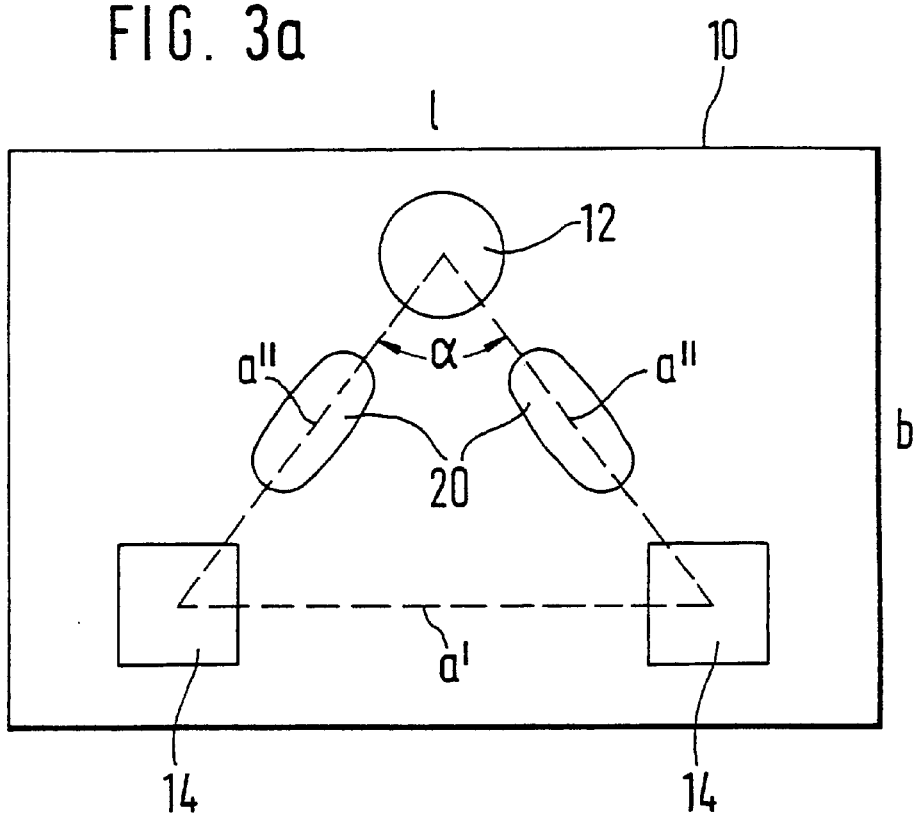
FIG. 3a shows a first implementation of a second embodiment of a sensor device according to the present invention.
Figure 3B:
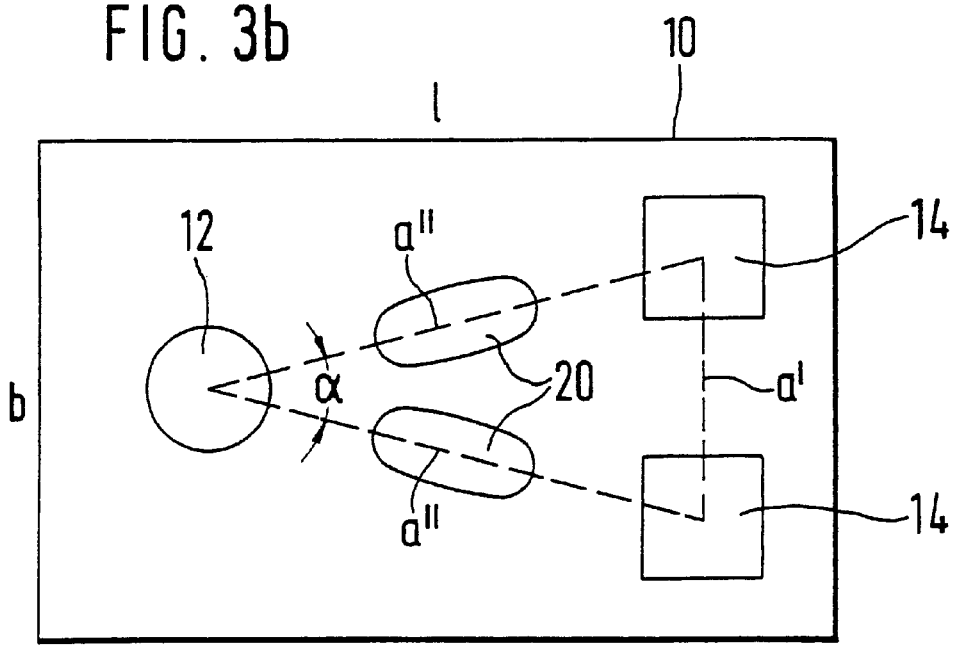
FIG. 3b shows a second implementation of a second embodiment of a sensor device according to the present invention.

FIGS. 3a and 3b show two implementations of a second embodiment of the sensor device having a contact area 10 of width b and length 1. A light emitting transmitter 12 and two light detecting receivers 14 are arranged above contact area 10, i.e., the fiber optic body. According to the present invention, transmitter 12 and receivers 14 span an isosceles triangle having sides a' and a" indicated by a dashed line. Two sides a" of base area 16 are preferably the same length or approximately the same length, and base side a' can be selected as desired.

Distances a" between transmitter 12 and two receivers 14 are defined, as already described regarding the first embodiment, so that radiation 26 injected into windshield 22 is reflected completely once or a plurality of times at the surface of windshield 22 and then is guided out of windshield 22 to both receivers 14.

Merely for the sake of thoroughness, it should be pointed out that a different length of sides a" requires a separate analysis by a signal processing arrangement of measuring zones 20 and the two sensor signals output by two receivers 14. In particular, amplification of the signal which is usually necessary must be adjusted separately.

Therefore, the dimensions of the triangle and thus of contact area 10 are essentially determined by the choice of distance a' and angle $\alpha$. FIGS. 2a and 2b show different angles $\alpha$ and resulting different dimensions b, 1 of contact area 10 of the sensor device.

What is claimed is:

1. A sensor device for detecting wetting on a windshield, the wetting including at least one of rainfall and soil, the sensor device comprising:
   at least one transmitter; and
   at least two receivers receiving a light emitted by the at least one transmitter, the at least one transmitter and the at least two receivers forming three optical elements of the sensor device, images of the at least one transmitter and the at least two receivers projecting onto a plane parallel to the windshield, the projected images forming corner points of an isosceles triangle;
   wherein an angle formed by legs of the isosceles triangle is less than ninety degrees.

2. The sensor device according to claim 1, wherein the at least one transmitter emits radiation in two directions to the at least two receivers.

3. The sensor device according to claim 1, wherein a distance between the at least one transmitter and one of the at least two receivers receiving the emitted light is determined so that only total reflection of the emitted light occurs in the windshield.

4. A sensor device for detecting wetting on a windshield, the wetting including at least one of rainfall and soil, the sensor device comprising:
   at least two transmitters; and
   at least two receivers receiving a light emitted by the at least two transmitters, the at least two transmitters and the at least two receivers forming four optical elements of the sensor device, images of the at least two transmitters and the at least two receivers projecting onto a plane parallel to the windshield, the projected images forming corner points of a parallelogram, the parallelogram being composed of two triangles.

5. The sensor device according to claim 4, wherein the at least two transmitters emit radiation in two directions to the at least two receivers.

6. The sensor device according to claim 4, wherein the sensor device has four measuring zones.

7. The sensor device according to claim 4, wherein one of the at least two transmitters and the at least two receivers are arranged at opposite corner points of the parallelogram.

8. The sensor device according to claim 4, wherein the parallelogram is a rhombus having equal distances between the at least two transmitters and the at least two receivers.

9. The sensor device according to claim 4, wherein an acute angle of the parallelogram is between zero and ninety degrees.

10. A sensor device for detecting wetting on a windshield, the wetting including at least one of rainfall and soil, the sensor device comprising:
    at least one transmitter;
    at least two receivers receiving a light emitted by the at least one transmitter, the at least one transmitter and the at least two receivers forming three optical elements of the sensor device, images of the at least one transmitter and the at least two receivers projecting onto a plane parallel to the windshield, the projected images forming corner points of an isosceles triangle; and
    a casing, a projection of the case forming a quadrilateral contact area on the windshield, the at least one transmitter and the at least two receivers being arranged within the quadrilateral contact area with substantially maximum utilization of the quadrilateral contact area.

11. The sensor device according to claim 10, wherein the quadrilateral contact area is rectangular.

* * * * *